(12) United States Patent
Shtrom et al.

(10) Patent No.: US 8,217,843 B2
(45) Date of Patent: Jul. 10, 2012

(54) ADJUSTMENT OF RADIATION PATTERNS UTILIZING A POSITION SENSOR

(75) Inventors: Victor Shtrom, Los Altos, CA (US); Bernard Baron, Mountain View, CA (US); William S. Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 613 days.

(21) Appl. No.: 12/404,127

(22) Filed: Mar. 13, 2009

(65) Prior Publication Data

US 2010/0231473 A1 Sep. 16, 2010

(51) Int. Cl.
*H01Q 1/24* (2006.01)

(52) U.S. Cl. ........................ 343/702; 343/757
(58) Field of Classification Search .................. 343/702, 343/757, 754
See application file for complete search history.

(56) References Cited

U.S. PATENT DOCUMENTS

| | | | |
|---|---|---|---|
| 723,188 A | 3/1903 | Tesla | |
| 725,605 A | 4/1903 | Tesla | |
| 1,869,659 A | 8/1932 | Broertjes | |
| 2,292,387 A | 8/1942 | Markey et al. | |
| 3,488,445 A | 1/1970 | Chang | |
| 3,568,105 A | 3/1971 | Felsenheld | |
| 3,967,067 A | 6/1976 | Potter | |
| 3,982,214 A | 9/1976 | Burns | |
| 3,991,273 A | 11/1976 | Mathes | |
| 4,001,734 A | 1/1977 | Burns | |
| 4,027,307 A | 5/1977 | Litchford | |
| 4,176,356 A | 11/1979 | Foster et al. | |
| 4,193,077 A | 3/1980 | Greenberg et al. | |
| 4,253,193 A | 2/1981 | Kennard | |
| 4,305,052 A | 12/1981 | Baril et al. | |
| 4,513,412 A | 4/1985 | Cox | |
| 4,554,554 A | 11/1985 | Olesen et al. | |
| 4,733,203 A | 3/1988 | Ayasli | |
| 4,814,777 A | 3/1989 | Monser | |
| 5,063,574 A | 11/1991 | Moose | |
| 5,097,484 A | 3/1992 | Akaiwa | |
| 5,173,711 A | 12/1992 | Takeuchi et al. | |

(Continued)

FOREIGN PATENT DOCUMENTS

DE 102006026350 A1 12/2006

(Continued)

OTHER PUBLICATIONS

Ando et al., "Study of Dual-Polarized Omni-Directional Antennas for 5.2 GHz-Band 2x2 MIMO-OFDM Systems," Antennas and Propogation Society International Symposium, 2004, IEEE, pp. 1740-1743 vol. 2.

(Continued)

*Primary Examiner* — Hoanganh Le
(74) *Attorney, Agent, or Firm* — Lewis and Roca LLP

(57) ABSTRACT

A device for a wireless RF link to a remote receiving device can radiate at different radiation patterns in response to detecting a change in the device position. As the device is moved, displaced, or re-positioned, a position sensor in the device detects the change in position and provides position information to a processor. The processor receives the position information from the position sensor, selects an antenna configuration and physical data rate based on the position information, and provides an RF signal associated with the selected antenna configuration through the antenna elements of the selected antenna configuration.

28 Claims, 7 Drawing Sheets

U.S. PATENT DOCUMENTS

| | | |
|---|---|---|
| 5,203,010 A | 4/1993 | Felix |
| 5,208,564 A | 5/1993 | Burns et al. |
| 5,220,340 A | 6/1993 | Shafai |
| 5,282,222 A | 1/1994 | Fattouche et al. |
| 5,291,289 A | 3/1994 | Hulyalkar et al. |
| 5,311,550 A | 5/1994 | Fouche et al. |
| 5,373,548 A | 12/1994 | McCarthy |
| 5,453,752 A | 9/1995 | Wang et al. |
| 5,507,035 A | 4/1996 | Bantz |
| 5,532,708 A | 7/1996 | Krenz et al. |
| 5,559,800 A | 9/1996 | Mousseau et al. |
| 5,754,145 A | 5/1998 | Evans |
| 5,767,755 A | 6/1998 | Kim et al. |
| 5,767,809 A | 6/1998 | Chuang et al. |
| 5,786,793 A | 7/1998 | Maeda et al. |
| 5,802,312 A | 9/1998 | Lazaridis et al. |
| 5,964,830 A | 10/1999 | Durrett |
| 5,990,838 A | 11/1999 | Burns et al. |
| 6,005,525 A | 12/1999 | Kivela |
| 6,011,450 A | 1/2000 | Miya |
| 6,031,503 A | 2/2000 | Preiss, II et al. |
| 6,034,638 A | 3/2000 | Thiel et al. |
| 6,052,093 A | 4/2000 | Yao et al. |
| 6,091,364 A | 7/2000 | Murakami et al. |
| 6,094,177 A | 7/2000 | Yamamoto |
| 6,097,347 A | 8/2000 | Duan et al. |
| 6,104,356 A | 8/2000 | Hikuma et al. |
| 6,169,523 B1 | 1/2001 | Ploussios |
| 6,266,528 B1 | 7/2001 | Farzaneh |
| 6,288,682 B1 | 9/2001 | Thiel et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,323,810 B1 | 11/2001 | Poilasne et al. |
| 6,326,922 B1 | 12/2001 | Hegendoerfer |
| 6,337,628 B2 | 1/2002 | Campana, Jr. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,404,386 B1 | 6/2002 | Proctor, Jr. et al. |
| 6,407,719 B1 | 6/2002 | Ohira et al. |
| RE37,802 E | 7/2002 | Fattouche et al. |
| 6,414,647 B1 | 7/2002 | Lee |
| 6,424,311 B1 | 7/2002 | Tsai et al. |
| 6,442,507 B1 | 8/2002 | Skidmore et al. |
| 6,445,688 B1 | 9/2002 | Garces et al. |
| 6,456,242 B1 | 9/2002 | Crawford |
| 6,492,957 B2 | 12/2002 | Carillo et al. |
| 6,493,679 B1 | 12/2002 | Rappaport et al. |
| 6,496,083 B1 | 12/2002 | Kushitani et al. |
| 6,498,589 B1 | 12/2002 | Horii |
| 6,499,006 B1 | 12/2002 | Rappaport et al. |
| 6,507,321 B2 | 1/2003 | Oberschmidt et al. |
| 6,531,985 B1 | 3/2003 | Jones et al. |
| 6,583,765 B1 | 6/2003 | Schamberger et al. |
| 6,586,786 B2 | 7/2003 | Kitazawa et al. |
| 6,606,059 B1 | 8/2003 | Barabash |
| 6,611,230 B2 | 8/2003 | Phelan |
| 6,625,454 B1 | 9/2003 | Rappaport et al. |
| 6,633,206 B1 | 10/2003 | Kato |
| 6,642,889 B1 | 11/2003 | McGrath |
| 6,674,459 B2 | 1/2004 | Ben-Shachar et al. |
| 6,701,522 B1 | 3/2004 | Rubin et al. |
| 6,724,346 B2 | 4/2004 | Le Bolzer |
| 6,725,281 B1 | 4/2004 | Zintel et al. |
| 6,741,219 B2 | 5/2004 | Shor |
| 6,747,605 B2 | 6/2004 | Lebaric |
| 6,753,814 B2 | 6/2004 | Killen et al. |
| 6,762,723 B2 | 7/2004 | Nallo et al. |
| 6,779,004 B1 | 8/2004 | Zintel |
| 6,819,287 B2 | 11/2004 | Sullivan et al. |
| 6,839,038 B2 | 1/2005 | Weinstein |
| 6,859,176 B2 | 2/2005 | Choi |
| 6,859,182 B2 | 2/2005 | Horii |
| 6,876,280 B2 | 4/2005 | Nakano |
| 6,876,836 B2 | 4/2005 | Lin et al. |
| 6,888,504 B2 | 5/2005 | Chiang et al. |
| 6,888,893 B2 | 5/2005 | Li et al. |
| 6,892,230 B1 | 5/2005 | Gu et al. |
| 6,903,686 B2 | 6/2005 | Vance et al. |
| 6,906,678 B2 | 6/2005 | Chen |
| 6,910,068 B2 | 6/2005 | Zintel et al. |
| 6,914,581 B1 | 7/2005 | Popek |
| 6,924,768 B2 | 8/2005 | Wu et al. |
| 6,931,429 B2 | 8/2005 | Gouge et al. |
| 6,941,143 B2 | 9/2005 | Mathur |
| 6,943,749 B2 | 9/2005 | Paun |
| 6,950,019 B2 | 9/2005 | Bellone et al. |
| 6,950,069 B2 | 9/2005 | Gaucher et al. |
| 6,961,028 B2 | 11/2005 | Joy et al. |
| 6,965,353 B2 | 11/2005 | Shirosaka et al. |
| 6,973,622 B1 | 12/2005 | Rappaport et al. |
| 6,975,834 B1 | 12/2005 | Forster |
| 6,980,782 B1 | 12/2005 | Braun et al. |
| 7,023,909 B1 | 4/2006 | Adams et al. |
| 7,034,769 B2 | 4/2006 | Surducan et al. |
| 7,034,770 B2 | 4/2006 | Yang et al. |
| 7,043,277 B1 | 5/2006 | Pfister |
| 7,050,809 B2 | 5/2006 | Lim |
| 7,053,844 B2 | 5/2006 | Gaucher et al. |
| 7,064,717 B2 | 6/2006 | Kaluzni et al. |
| 7,085,814 B1 | 8/2006 | Ghandi et al. |
| 7,088,299 B2 | 8/2006 | Siegler et al. |
| 7,089,307 B2 | 8/2006 | Zintel et al. |
| 7,130,895 B2 | 10/2006 | Zintel et al. |
| 7,164,380 B2 | 1/2007 | Saito |
| 7,171,475 B2 | 1/2007 | Weisman et al. |
| 7,193,562 B2 | 3/2007 | Shtrom et al. |
| 7,277,063 B2 | 10/2007 | Shirosaka et al. |
| 7,298,228 B2 | 11/2007 | Sievenpiper |
| 7,312,762 B2 | 12/2007 | Puente Ballarda et al. |
| 7,319,432 B2 | 1/2008 | Andersson |
| 7,525,486 B2 | 4/2009 | Shtrom et al. |
| 7,609,648 B2 | 10/2009 | Hoffmann et al. |
| 7,733,275 B2 * | 6/2010 | Hirota ............................ 343/702 |
| 7,847,741 B2 * | 12/2010 | Hirota ............................ 343/702 |
| 7,916,463 B2 * | 3/2011 | Aya et al. .................. 361/679.28 |
| 2001/0046848 A1 | 11/2001 | Kenkel |
| 2002/0031130 A1 | 3/2002 | Tsuchiya et al. |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0101377 A1 | 8/2002 | Crawford |
| 2002/0105471 A1 | 8/2002 | Kojima et al. |
| 2002/0112058 A1 | 8/2002 | Weisman et al. |
| 2002/0158798 A1 | 10/2002 | Chiang et al. |
| 2002/0170064 A1 | 11/2002 | Monroe et al. |
| 2003/0026240 A1 | 2/2003 | Eyuboglu et al. |
| 2003/0030588 A1 | 2/2003 | Kalis et al. |
| 2003/0038698 A1 | 2/2003 | Hirayama |
| 2003/0063591 A1 | 4/2003 | Leung et al. |
| 2003/0122714 A1 | 7/2003 | Wannagot et al. |
| 2003/0169330 A1 | 9/2003 | Ben-Shachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2004/0014432 A1 | 1/2004 | Boyle |
| 2004/0017310 A1 | 1/2004 | Runkle et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |

| | | | |
|---|---|---|---|
| 2004/0080455 | A1 | 4/2004 | Lee |
| 2004/0095278 | A1 | 5/2004 | Kanemoto et al. |
| 2004/0114535 | A1 | 6/2004 | Hoffmann et al. |
| 2004/0125777 | A1 | 7/2004 | Doyle et al. |
| 2004/0145528 | A1 | 7/2004 | Mukai et al. |
| 2004/0160376 | A1 | 8/2004 | Hornsby et al. |
| 2004/0190477 | A1 | 9/2004 | Olson et al. |
| 2004/0203347 | A1 | 10/2004 | Nguyen |
| 2004/0260800 | A1 | 12/2004 | Gu et al. |
| 2005/0022210 | A1 | 1/2005 | Zintel et al. |
| 2005/0041739 | A1 | 2/2005 | Li et al. |
| 2005/0042988 | A1 | 2/2005 | Hoek et al. |
| 2005/0048934 | A1 | 3/2005 | Rawnick et al. |
| 2005/0074108 | A1 | 4/2005 | Zintel et al. |
| 2005/0097503 | A1 | 5/2005 | Zintel et al. |
| 2005/0128983 | A1 | 6/2005 | Kim et al. |
| 2005/0135480 | A1 | 6/2005 | Li et al. |
| 2005/0138137 | A1 | 6/2005 | Encarnacion et al. |
| 2005/0138193 | A1 | 6/2005 | Encarnacion et al. |
| 2005/0146475 | A1 | 7/2005 | Bettner et al. |
| 2005/0180381 | A1 | 8/2005 | Retzer et al. |
| 2005/0188193 | A1 | 8/2005 | Kuehnel et al. |
| 2005/0240665 | A1 | 10/2005 | Gu et al. |
| 2005/0267935 | A1 | 12/2005 | Gandhi et al. |
| 2006/0094371 | A1 | 5/2006 | Nguyen |
| 2006/0098607 | A1 | 5/2006 | Zeng et al. |
| 2006/0123124 | A1 | 6/2006 | Weisman et al. |
| 2006/0123125 | A1 | 6/2006 | Weisman et al. |
| 2006/0123455 | A1 | 6/2006 | Pai et al. |
| 2006/0168159 | A1 | 7/2006 | Weisman et al. |
| 2006/0184660 | A1 | 8/2006 | Rao et al. |
| 2006/0184661 | A1 | 8/2006 | Weisman et al. |
| 2006/0184693 | A1 | 8/2006 | Rao et al. |
| 2006/0224690 | A1 | 10/2006 | Falkenburg et al. |
| 2006/0225107 | A1 | 10/2006 | Seetharaman et al. |
| 2006/0227761 | A1 | 10/2006 | Scott, III et al. |
| 2006/0239369 | A1 | 10/2006 | Lee |
| 2006/0262015 | A1 | 11/2006 | Thornell-Pers et al. |
| 2006/0291434 | A1 | 12/2006 | Gu et al. |
| 2007/0027622 | A1 | 2/2007 | Cleron et al. |
| 2007/0037619 | A1* | 2/2007 | Matsunaga et al. ........ 455/575.7 |
| 2007/0135167 | A1 | 6/2007 | Liu |
| 2008/0096492 | A1* | 4/2008 | Yoon .............................. 455/83 |
| 2009/0295648 | A1* | 12/2009 | Dorsey et al. ................. 343/702 |

FOREIGN PATENT DOCUMENTS

| | | |
|---|---|---|
| EP | 352787 A2 | 1/1990 |
| EP | 0 534 612 | 3/1993 |
| EP | 0 756 381 | 1/1997 |
| EP | 0883206 A2 | 5/1998 |
| EP | 1 152 543 | 11/2001 |
| EP | 1 376 920 | 6/2002 |
| EP | 1 315 311 | 5/2003 |
| EP | 1 450 521 | 8/2004 |
| EP | 1 608 108 | 12/2005 |
| GB | 2426870 A | 6/2006 |
| GB | 2423191 A | 8/2006 |
| JP | 03038933 | 2/1991 |
| JP | 2008/088633 | 2/1996 |
| JP | 2001/057560 | 2/2002 |
| JP | 2005/354249 | 12/2005 |
| JP | 2006/060408 | 3/2006 |
| WO | WO 90/04893 | 5/1990 |
| WO | WO 01013461 A1 | 2/2001 |
| WO | WO 02/25967 | 3/2002 |
| WO | WO 03/079484 | 9/2003 |

OTHER PUBLICATIONS

Bedell, Paul, "Wireless Crash Course," 2005, p. 84, The McGraw-Hill Companies, Inc., USA.

Petition Decision Denying Request to Order Additional Claims for U.S. Patent No. 7,193,562 (Control No. 95/001078) mailed on Jul. 10, 2009.

Right of Appeal Notice for U.S. Patent No. 7,193,562 (Control No. 95/001078) mailed on Jul. 10, 2009.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.

Dell Inc., "How Much Broadcast and Multicast Traffic Should I Allow in My Network," PowerConnect Application Note #5, Nov. 2003.

Toskala, Antti, "Enhancement of Broadcast and Introduction of Multicast Capabilities in RAN," Nokia Networks, Palm Springs, California, Mar. 13-16, 2001.

Microsoft Corporation, "IEEE 802.11 Networks and Windows XP," Windows Hardware Developer Central, Dec. 4, 2001.

Festag, Andreas, "What is MOMBASA?" Telecommunication Networks Group (TKN), Technical University of Berlin, Mar. 7, 2002.

Hewlett Packard, "HP ProCurve Networking: Enterprise Wireless LAN Networking and Mobility Solutions," 2003.

Dutta, Ashutosh et al., "MarconiNet Supporting Streaming Media Over Localized Wireless Multicast," Proc. of the 2d Int'l Workshop on Mobile Commerce, 2002.

Dunkels, Adam et al., "Making TCP/IP Viable for Wireless Sensor Networks," Proc. of the 1st Euro. Workshop on Wireless Sensor Networks, Berlin, Jan. 2004.

Dunkels, Adam et al., "Connecting Wireless Sensornets with TCP/IP Networks," Proc. of the 2d Int'l Conf. on Wired Networks, Frankfurt, Feb. 2004.

Cisco Systems, "Cisco Aironet Access Point Software Configuration Guide: Configuring Filters and Quality of Service," Aug. 2003.

Hirayama, Koji et al., "Next-Generation Mobile-Access IP Network," Hitachi Review vol. 49, No. 4, 2000.

Pat Calhoun et al., "802.11r strengthens wireless voice," Technology Update, Network World, Aug. 22, 2005, http://www.networkworld.com/news/tech/2005/082208techupdate.html.

Areg Alimian et al., "Analysis of Roaming Techniques," doc.:IEEE 802.11-04/0377r1, Submission, Mar. 2004.

Information Society Technologies Ultrawaves, "System Concept / Architecture Design and Communication Stack Requirement Document," Feb. 23, 2004.

Golmie, Nada, "Coexistence in Wireless Networks: Challenges and System-Level Solutions in the Unlicensed Bands," Cambridge University Press, 2006.

Mawa, Rakesh, "Power Control in 3G Systems," Hughes Systique Corporation, Jun. 28, 2006.

Wennstrom, Mattias et al., "Transmit Antenna Diversity in Ricean Fading MIMO Channels with Co-Channel Interference," 2001.

Chuang et al., A 2.4 GHz Polarization-diversity Planar Printed Dipole Antenna for WLAN and Wireless Communication Applications, Microwave Journal, vol. 45, No. 6, pp. 50-62 (Jun. 2002).

Frederick et al., Smart Antennas Based on Spatial Multiplexing of Local Elements (SMILE) for Mutual Coupling Reduction, IEEE Transactions of Antennas and Propogation, vol. 52., No. 1, pp. 106-114 (Jan. 2004).

W.E. Doherty, Jr. et al., The Pin Diode Circuit Designer's Handbook (1998).

Varnes et al., A Switched Radial Divider for an L-Band Mobile Satellite Antenna, European Microwave Conference (Oct. 1995), pp. 1037-1041.

English Translation of PCT Pub. No. WO2004/051798 (as filed US National Stage U.S. Appl. No. 10/536,547).

Behdad et al., Slot Antenna Miniaturization Using Distributed Inductive Loading, Antenna and Propagation Society International Symposium, 2003 IEEE, vol. 1, pp. 308-311 (Jun. 2003).

Press Release, NETGEAR RangeMax(TM) Wireless Networking Solutions Incorporate Smart MIMO Technology to Eliminate Wireless Dead Spots and Take Consumers Farther, Ruckus Wireles Inc. (Mar. 7, 2005), available at http://ruckuswireless.com/press/releases/20050307.php.

Steger, Christopher et al., "Performance of IEEE 802.11b Wireless LAN in an Emulated Mobile Channel," 2003.

Chang, Nicholas B. et al., "Optimal Channel Probing and Transmission Scheduling for Opportunistics Spectrum Access," Sep. 2007.

"Authorization of Spread Spectrum Systems Under Parts 15 and 90 of the FCC Rules and Regulations," Rules and Regulations Federal Communications Commission, 47 CFR Part 2, 15, and 90, Jun. 18, 1985.

"Authorization of spread spectrum and other wideband emissions not presently provided for in the FCC Rules and Regulations," Before the Federal Communications Commission, FCC 81-289, 87 F.C.C.2d 876, Gen Docket No. 81-413, Jun. 30, 1981.

RL Miller, "4.3 Project X—A True Secrecy System for Speech," Engineering and Science in the Bell System, A History of Engineering and Science in the Bell System National Service in War and Peace (1925-1975), pp. 296-317, 1978, Bell Telephone Laboratories, Inc.

Chang, Robert W., "Synthesis of Band-Limited Orthogonal Signals for Multichannel Data Transmission," The Bell System Technical Journal, Dec. 1966, pp. 1775-1796.

Cimini, Jr., Leonard J, "Analysis and Simulation of a Digital Mobile Channel Using Orthogonal Frequency Division Multiplexing," IEEE Transactions on Communications, vol. Com-33, No. 7, Jul. 1985, pp. 665-675.

Saltzberg, Burton R., "Performance of an Efficient Parallel Data Transmission System," IEEE Transactions on Communication Technology, vol. Com-15, No. 6, Dec. 1967, pp. 805-811.

Weinstein, S. B., et al., "Data Transmission by Frequency-Division Multiplexing Using the Discrete Fourier Transform," IEEE Transactions on Communication Technology, vol. Com-19, No. 5, Oct. 1971, pp. 628-634.

Moose, Paul H., "Differential Modulation and Demodulation of Multi-Frequency Digital Communications Signals," 1990 IEEE,CH2831-6/90/0000-0273.

Casas, Eduardo F., et al., "OFDM for Data Communication Over Mobile Radio FM Channels—Part I: Analysis and Experimental Results," IEEE Transactions on Communications, vol. 39, No. 5, May 1991, pp. 783-793.

Casas, Eduardo F., et al., "OFDM for Data Communication over Mobile Radio FM Channels; Part II: Performance Improvement," Department of Electrical Engineering, University of British Columbia.

Chang, Robert W., et al., "A Theoretical Study of Performance of an Orthogonal Multiplexing Data Transmission Scheme," IEEE Transactions on Communication Technology, vol. Com-16, No. 4, Aug. 1968, pp. 529-540.

Gledhill, J. J., et al., "The Transmission of Digital Television in the UHF Band Using Orthogonal Frequency Division Multiplexing," Sixth International Conference on Digital Processing of Signals in Communications, Sep. 2-6, 1991, pp. 175-180.

Alard, M., et al., "Principles of Modulation and Channel Coding for Digital Broadcasting for Mobile Receivers," 8301 EBU Review Technical, Aug. 1987, No. 224, Brussels, Belgium.

Berenguer, Inaki, et al., "Adaptive MIMO Antenna Selection," Nov. 2003.

Gaur, Sudhanshu, et al., "Transmit/Receive Antenna Selection for MIMO Systems to Improve Error Performance of Linear Receivers," School of ECE, Georgia Institute of Technology, Apr. 4, 2005.

Sadek, Mirette, et al., "Active Antenna Selection in Multiuser MIMO Communications," IEEE Transactions on Signal Processing, vol. 55, No. 4, Apr. 2007, pp. 1498-1510.

Molisch, Andreas F., et al., "MIMO Systems with Antenna Selection—an Overview," Draft, Dec. 31, 2003.

U.S. Appl. No. 95/001,078, Sep. 4, 2008, Shtrom et al. (Re-Exam).

U.S. Appl. No. 95/001,079, Sep. 4, 2008, Shtrom et al. (Re-Exam).

Supplementary European Search Report for foreign application No. EP07755519 dated Mar. 11, 2009.

Examination Report mailed on Jan. 21, 2011 and received in European patent application No. 05 776 697.4.

Tsunekawa, Kouichi, "Diversity Antennas for Portable Telephones," 39th IEEE Vehicular Technology Conference, pp. 50-56, vol. I, Gateway to New Concepts in Vehicular Technology, May 1-3, 1989, San Francisco, CA.

\* cited by examiner

500

| Device Position | Antenna Configuration | Attempted Transmissions | Successful Transmissions | Success Ratio | RSSI |
|---|---|---|---|---|---|
| 1 | 1 | | | | |
| 1 | 2 | | | | |
| 1 | 3 | | | | |
| 1 | 4 | | | | |
| 2 | 1 | | | | |
| 2 | 2 | | | | |
| 2 | 3 | | | | |
| 2 | 4 | | | | |
| 3 | 1 | | | | |
| 3 | 2 | | | | |
| 3 | 3 | | | | |
| 3 | 4 | | | | |
| 4 | 1 | | | | |
| 4 | 2 | | | | |
| 4 | 3 | | | | |
| 4 | 4 | | | | |

FIGURE 5

ADJUSTMENT OF RADIATION PATTERNS UTILIZING A POSITION SENSOR

BACKGROUND OF THE INVENTION

1. Field of the Invention

The present invention generally relates to wireless communications and more particularly to changing radio frequency (RF) emission patterns with respect to one or more antenna arrays.

2. Description of the Related Art

In wireless communications systems, there is an ever-increasing demand for higher data throughput and a corresponding drive to reduce interference that can disrupt data communications. A wireless link in an Institute of Electrical and Electronic Engineers (IEEE) 802.11 network may be susceptible to interference from other access points and stations, other radio transmitting devices, and changes or disturbances in the wireless link environment between an access point and remote receiving node. The interference may degrade the wireless link thereby forcing communication at a lower data rate. The interference may, in some instances, be sufficiently strong as to disrupt the wireless link altogether.

One solution is to utilize a diversity antenna scheme. In such a solution, a data source and intermediate RF generating device are coupled to two or more physically separated omnidirectional antennas. An access point may select one of the omnidirectional antennas by which to maintain a wireless link. Because of the separation between the omnidirectional antennas, each antenna experiences a different signal environment and corresponding interference level with respect to the wireless link. A switching network couples the intermediate RF generating device and corresponding data source to whichever of the omnidirectional antennas experiences the least interference in the wireless link.

Many methods that provide for switching among antenna configurations, such as diversity antennas, and other methods of controlling antenna segments fail to effectively minimize the interference from other access points, other radio transmitting devices, or disturbances in the environment of the wireless link between the access point and the remote receiving node. Methods for antenna configuration selection are typically by trial-and-error.

In such a trial-and-error approach, a transmission is made on each antenna configuration to determine which antenna configuration provides a more effective wireless link as might be measured by a packet error ratio. The trial-and-error approach is inefficient as it generally requires transmission on a "bad" antenna configuration to determine the particularities of the poor quality of that antenna configuration. Further, as the transmitting or receiving device move around, new sources of interference arise to degrade a transmission. The trial-and-error approach therefore becomes increasingly inefficient with a large number of antenna configurations and devices that may have adjustable positions.

FIG. 1 is a block diagram of a wireless device 110 in communication with one or more remote recipient device and as is generally known in the prior art. While not shown, the wireless device 110 of FIG. 1 includes an antenna apparatus, an RF transmitter and/or a receiver, which may operate using the 802.11 protocol. The wireless device 110 of FIG. 1 may be illustrative of a set-top box, a laptop computer, a television, a PCMCIA card, a remote control, a cellular telephone, a handheld gaming device, or a remote terminal.

The wireless device 110 may be a handheld device that receives input through an input mechanism configured to be used by a user. The wireless device 110 may then process the input and generates an RF signal. The generated RF signal may then be transmitted to one or more nodes 120, 130 and 140 via wireless links. Nodes 120-140 may receive data, transmit data, or transmit and receive data (i.e., a data transceiver).

Wireless device 110 may also be an access point for communicating with one or more remote receiving nodes over a wireless link as might occur in an 802.11 wireless network. The wireless device 110 may receive data from a router connected to the Internet (not shown). The wireless device 110 may then convert and wirelessly transmit the data to one or more remote receiving nodes (e.g., receiving nodes 120-140). The wireless device 110/access point may also receive a wireless transmission from one of the nodes 120-140 convert the data and allow for transmission of that data over the Internet via the aforementioned router. The wireless device 110 may also form a part of a wireless local area network (LAN) that allows for communications among two or more of nodes 120-140. For example, node 140, which may be a cellular phone with WiFi capability, may communicate with node 120, which may be a laptop computer including a WiFi card or chip with wireless capabilities. Those communications may be routed through the wireless device 110, which creates the wireless LAN environment.

Wireless device 110 may be placed in different positions on a wall, desk, or in conjunction with another structure. The radiation pattern emitted by the wireless device 110 may then be based on the detected position of the device. A radiation pattern that extends in a horizontal manner from the wireless device 110 may be desirable for a device mounted flat against a ceiling of room or on a central table-like surface. Alternatively, when the device is mounted on its side and against a wall, a radiation pattern may extend outward in a vertical manner from the wireless device 110. Such an arrangement may be desirable if one or more nodes 120-140 are attempting to interact with an access point (wireless device 110) on different floors of a building.

Arranging wireless access points or other wireless devices in such a manner may require the party responsible for installation of wireless device 110 to ensure that it is properly configured for a horizontal and/or vertical wireless transmission. This is especially true with prior art wireless devices and access points that tend to transmit only in one-dimension. The particulars of any given radiation pattern generated by a wireless device may be not be immediately apparent to an individual charged with creating a wireless network but otherwise lacking extensive knowledge into RF emission patterns. Further difficulties might arise with respect to intermediate arrangements of the wireless device (e.g., at a 45 degree angle).

The problems associated with radiation patterns become even more apparent with respect to mobile devices, especially cellular phones or mobile devices with WiFi capability. Such devices are constantly in motion and may at one moment be on a horizontal plane with an access point and a few moments later be vertical to the access point. The angle of a mobile device vis-à-vis the access point may change in as a little as a few seconds as a user may walk around an office or even bring the device from their desktop up to their ear as they stand at their desk.

There is a need in the art for adjusting antenna patterns and corresponding radiation patterns to address the particularities of any given wireless environment. Such a solution should take into account not only causes of interference but also the physical position and configuration of the transmitting or receiving device.

SUMMARY OF THE PRESENTLY CLAIMED INVENTION

In a first claimed embodiment, a device for transmitting a radiation signal is disclosed. An antenna apparatus includes multiple antenna configurations, each corresponding to a radiation pattern. A position sensor in the device detects changes in position of the device. A processor receives the position information from the position sensor to select an antenna configuration and physical data rate based on the position information.

In a further claimed embodiment, a device for transmitting a wireless signal includes an antenna apparatus, antenna configuration selection module, and tilt sensor. The antenna apparatus may be configured in a variety of configurations corresponding to various radiation patterns. The selection module may select a first configuration of the antenna apparatus and a second configuration the antenna apparatus based on a position of the wireless device as detected by the tilt sensor.

In a third claimed embodiment, a wireless device for transmitting a wireless signal is disclosed. The wireless device includes an antenna apparatus, position sensor, and antenna configuration selection module. Various antenna configurations, each associated with a radiation pattern, are possible with respect to the antenna apparatus. The position sensor detects a position of the wireless device while execution of the antenna selection modules causes selection of an antenna configuration based on the detected position of the wireless device position.

In a fourth claimed embodiment, a method for adjusting a radiation pattern is disclosed. The method includes select a first antenna configuration corresponding to a radiation pattern when a wireless device is in a first position; transmitting an RF signal using the first configuration; detecting a change in the position of the device; selecting a second antenna configuration having a second pattern; and transmitting an RF signal using the second configuration.

BRIEF DESCRIPTION OF THE FIGURES

FIG. 5 is an exemplary table of transmission control data as may be utilized by the wireless device of FIG. 3.

DETAILED DESCRIPTION

A device for a wireless RF link to a remote receiving device includes an antenna apparatus with selectable antenna elements for transmitting and receiving an RF signal, a signal converter for converting between encoded signals and RF signals, a processor for controlling the signal converter and the antenna apparatus, and a position sensor. As the device is moved, displaced, or re-positioned, the position sensor detects a change in position and provides position information to the processor. The processor receives the position information from the position sensor, selects an antenna configuration based on the position information, and selects a physical data rate to maximize data transmission speed. The processor then provides an encoded signal to the signal converter and controls the converter and antenna apparatus to provide an RF signal through the antenna elements of the selected antenna configuration.

For example, when the device is in a first position in a vertical and upright position, the directional radiation pattern resulting from a selected antenna configuration may extend horizontally and perpendicular. When the wireless device position is changed so that it resides on a side and in a horizontal position (i.e., ninety degrees from the previous position), the change in position is detected and a second antenna configuration having a second radiation pattern. The second radiation pattern may extend through the top of the device. If no change to the antenna configuration was made in response to the changed position, the selected antenna configuration would result in a radiation pattern that extends in a vertical position (still perpendicular from the sides of the device), and thus a weaker signal in the original direction from the horizontal position.

A device RF signal can also be changed due to interference from other radio transmitting devices detected at the new device position, or disturbances in the wireless link between the system and the remote receiving device. The processor may select an antenna configuration with a resulting radiation pattern that minimizes the interference. The processor may select an antenna configuration corresponding to a maximum gain between the system and the remote receiving device. Alternatively, the processor may select an antenna configuration corresponding to less than maximal gain, but corresponding to reduced interference in the wireless link. Similarly, the processor may select a physical data rate that maximizes data transmission speed, referred to herein as an effective user data rate, over the wireless link to the remote receiving device.

Figure 1:
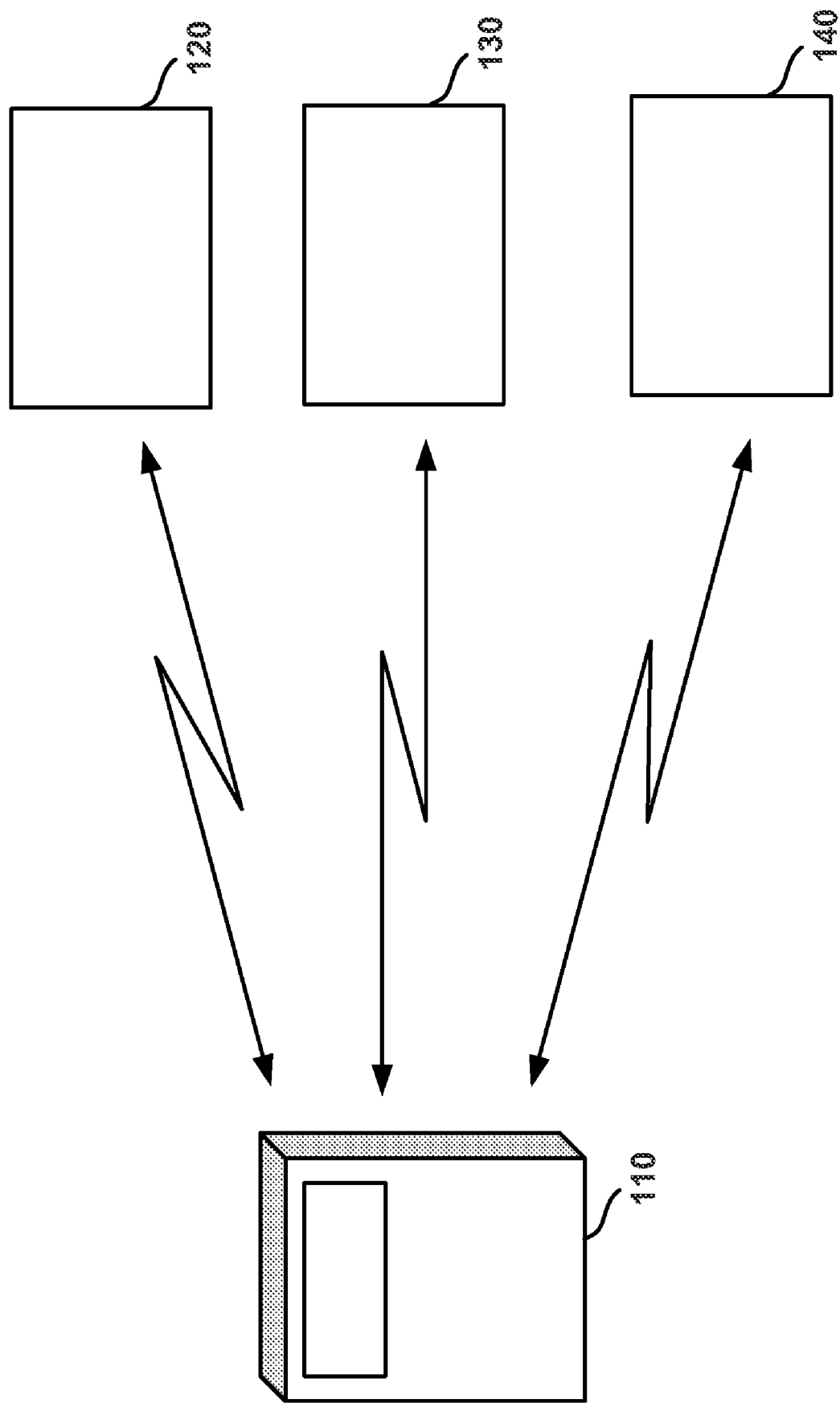
FIG. 1 is a block diagram of a wireless device in communication with one or more remote recipient devices and as is generally known in the prior art.
Figure 2:
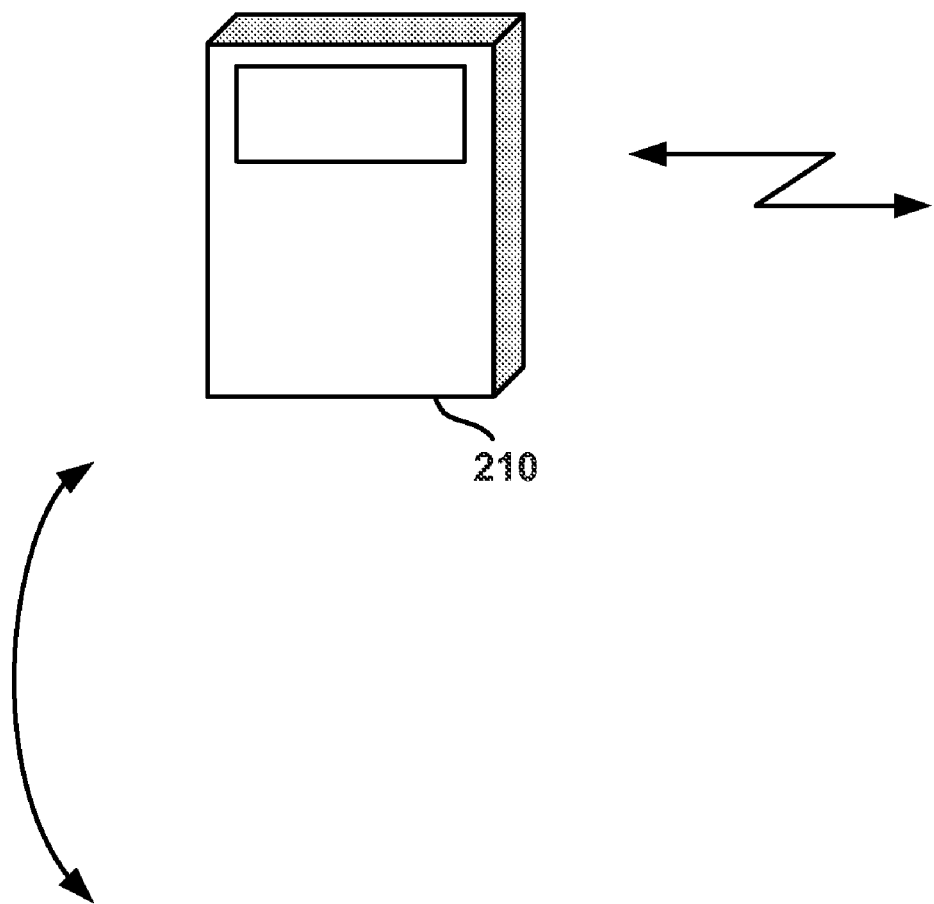
FIG. 2 is a block diagram of an exemplary wireless device transmitting an RF signal in different physical positions.
Figure 2:
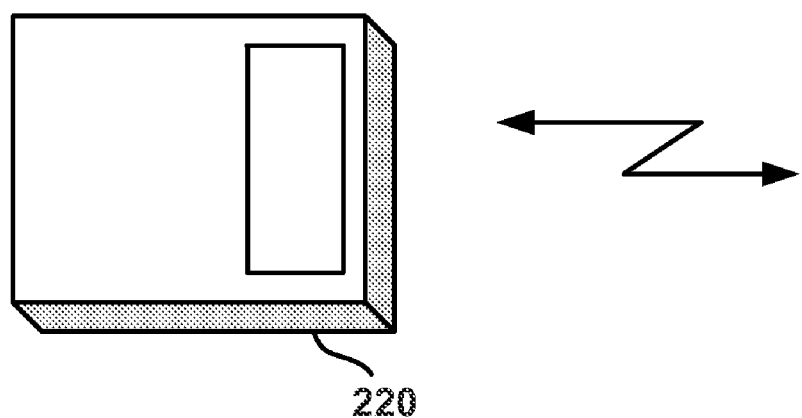

FIG. 2 is a block diagram of an exemplary wireless device 210 transmitting a signal while in different physical positions. Wireless device 210 may also receive a wireless signal. While not illustrated, the wireless device 210 of FIG. 2 includes selectable antenna elements, a signal converter, a processor, memory, various software elements, which may be stored in memory and executable by a processor, and a position sensor. In the upright position, wireless device 210 has an antenna configuration having a horizontal radiation pattern which extends horizontally from a side of device 210.

As wireless device 210 changes position—by approximately ninety degrees from the vertical position to the horizontal position in FIG. 2—and is placed on a side, the change of position being detected by an internal position sensor, the antenna configuration is adjusted in an according fashion and based on the current detected position or the detected change of position such that a radiation pattern is generated that extends outward and from the top of wireless device 210 thereby resulting in a second radiation pattern that extends through space in the same direction as the first radiation pattern provided by wireless device 210. Had the wireless pattern not been adjusted from the change in physical position of wireless device 210, the radiation pattern would in a vertical pattern, which may be of use only to a receiving device immediately above or below the wireless transmitting device 210.

Figure 3:
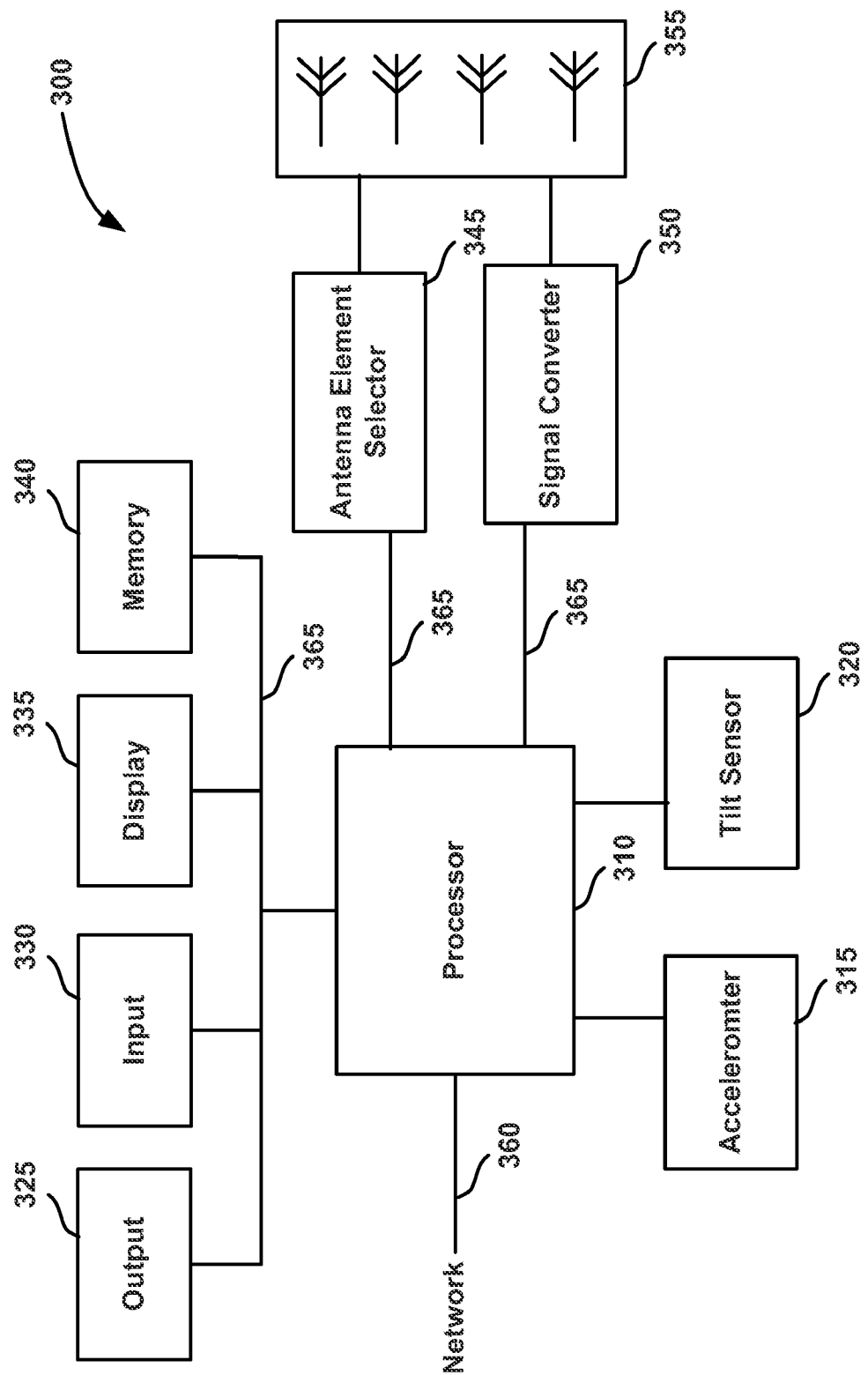
FIG. 3 is a block diagram of an exemplary wireless device, which may be configured in different physical positions like that disclosed in FIG. 2.

FIG. 3 is a block diagram of an exemplary wireless device 300, which may be configured in different physical positions like that disclosed in FIG. 2. Wireless device 300 may be any device that can be moved and is capable of transmitting and receiving a wireless signal. For example, wireless device 300 may be implemented as a cellular phone, personal digital assistant, gaming controller, a lap top computer, or access point subject to being moved. Wireless device 300 as illustrated in FIG. 3 includes processor 310, accelerometer 315, tilt sensor 320, output 325, input 330, display 335, memory 340, antenna element selector 345, signal converter 350, antenna elements 355, network connection 360, and data bus 365.

Processor 310 of FIG. 3 is coupled to a memory 340. Processor 310 may be representative of a microcontroller, a microprocessor, or an application-specific integrated circuit (ASIC). The processor 310 may execute programs stored in memory 340. Memory 340 may also store transmission control data, which may be retrieved by the processor 310 to control selection of the antenna configuration of the antenna apparatus 355 and selection of the physical data rate of the signal converter 350. Aspects of transmission control, antenna element selection, data rate and so forth are discussed in greater detail with respect to FIGS. 4 and 5, below.

Processor 310 of FIG. 3 is further coupled to antenna element selector device 345 such coupling occurring via control bus 365. Antenna element selector device 345 is, in turn, coupled to antenna apparatus 355 to allow selection of individual or groups of antenna elements. Different combinations of selected antenna elements may result in different radiation patterns. Processor 310 controls the antenna element selector device 345 to select a radiation pattern corresponding to a given antenna configuration of antenna apparatus 355.

Processor 310 is also coupled to the signal converter 350 by the control bus 365. Processor 310 controls signal converter 350 to select a physical data rate from multiple physical data rates at which the signal converter 350 converts data bits into RF signals for transmission via the antenna apparatus 355.

Processor 310 may receive packet data from an external network 360. Received packet data is converted into data corresponding to an 802.11 wireless protocol at signal converter 350 (e.g., a radio modulator/demodulator) at the selected physical data rate. The converted data is transmitted as an RF transmission via the antenna apparatus 355 to a remote node over a wireless link.

Antenna apparatus 110 includes a plurality of individually selectable antenna elements (not shown) within antenna apparatus 355. For example, the antenna apparatus may include two antenna elements, three four antenna elements, or more than four antenna elements. When selected, each of the antenna elements produces a directional radiation pattern with gain as compared to an omnidirectional antenna. The elements of antenna apparatus 355 are each either directly coupled to an antenna element selector 345 or via an intermediate individual antenna element. Antenna element selector 345 selectively couples one or more of the antenna elements to the signal converter 350 for transmitting a generated RF signal. Various embodiments of the antenna apparatus 355 and the antenna element selector device 345 are further described in commonly owned U.S. Pat. Nos. 7,292,198; 7,193,562; and 7,362,280.

Device 300 may include any number of ports or interfaces, which may correspond to serial communication architectures like Universal Serial Bus (USB), RS-x, FireWire, Ethernet, SCSI, and PCI Express or parallel communication architectures such as ATA, HIPPI, IEEE-488, and PCMCIA for output devices 325 and input devices 330. Examples of suitable output devices include speakers, printers, network interfaces, and monitors. Input devices 330 may include or be coupled to user interfaces such as alpha-numeric keypads and keyboards, or pointing devices such as a mouse, a trackball, stylus, or cursor direction keys.

Display system 335 may include a liquid crystal display (LCD) or other suitable display device. Display system 335 receives textual and graphical information, and processes the information for output to the display device. Output 325, input 330, display 335 and memory 340 are coupled to processor 310 via one or more buses 365.

Tilt sensor 320 can measure the tilting in two axes of a reference plane. Tilt sensor 320 may detect pitch and roll and look angles and may be used to detect a change of position such as angular tilt and transmit a signal indicating the position or tilt to processor 310. Processor 310 may then process the signal to select an antenna configuration that provides the best coverage signal for the current position of the wireless device 300. Tilt sensor 320 may be implemented as one or more horizontal, vertical, analog, or digital tilt sensors, and may be implemented as an electrolytic, mercury, gas bubble liquid, pendulum, or other type of tilt sensor.

For example, tilt sensor 320 may be an electrolytic tilt sensor, which produces an electric signal to indicate how much a structure is leaning in reference to gravity. Tilt sensor 320 may, in the context of a wireless access point, detect whether device 300 is positioned in a horizontal position (e.g., flat against a ceiling), in a vertical position (e.g., against a wall), or in some other position. A tilt sensor may also determinate, in the case of a mobile phone, determine whether the wireless device 300 is positioned upright or is laying relatively flat on a surface such as a table and generate a signal used in the selection of an antenna configuration at antenna apparatus 355 and corresponding radiation pattern.

Accelerometer 315 can measure acceleration forces experienced by wireless device 300. These forces may be static such as constant force of gravity pulling at the device, or dynamic such as a force caused by moving or vibrating device 300. When an acceleration force is detected by accelerometer 315, accelerometer 315 can provide a signal to processor 310 to report the detected acceleration. Processor 310 can process the accelerometer signal to aid in the selection of an antenna configuration at antenna apparatus 355 that provides a suitable radiation pattern based on any acceleration or change in the position of device 300. In some cases, though tilt sensor may not detect a changed position of device 300, accelerometer 315 may detect acceleration in device 300. In such circumstances, processor 310 may probe for an antenna configuration that provides the best radiation pattern in response to the accelerometer signal.

Wireless device 300 may also include a global positioning system (GPS) device. The GPS device may be coupled to processor 310 and able to receive and process signals received from GPS satellites or other signal sources. The location of wireless device 300 may be determined by estimating the time for the GPS device to receive a signal from source satellites or other signal sources. The determined location can be provided to processor 310 as a signal by the GPS device. Processor 310 can process the GPS device signal to aid in the selection of an antenna configuration at antenna apparatus 355 that provides a suitable radiation pattern based on any current position or change in the position of device 300.

Memory 340 may include programs and instructions for execution by processor 310. When executed, the programs may select antenna configurations based on a detected position, change in position, or other position information provided by accelerometer 315 and/or tilt sensor 320. Selecting an antenna configuration may include creating a table having transmission parameter control data for each remote node. The table may include link quality metrics for each antenna configuration. Some examples of link quality metrics are a success ratio, an effective user data rate, a received signal strength indicator (RSSI), and error vector magnitude (EVM).

The success ratio can be calculated as a number of data packets received by the particular remote receiving node 130 divided by a number of data packets transmitted to the remote receiving node 130. The success ratio may be dependent on the physical data rate used to transmit on the antenna configuration. The table may be sorted by the success ratio, for example, so that highly successful antenna configurations may be preferably selected. A success ratio may also be calculated in a similar fashion with respect to data successfully received from a transmitting node.

Figure 4:
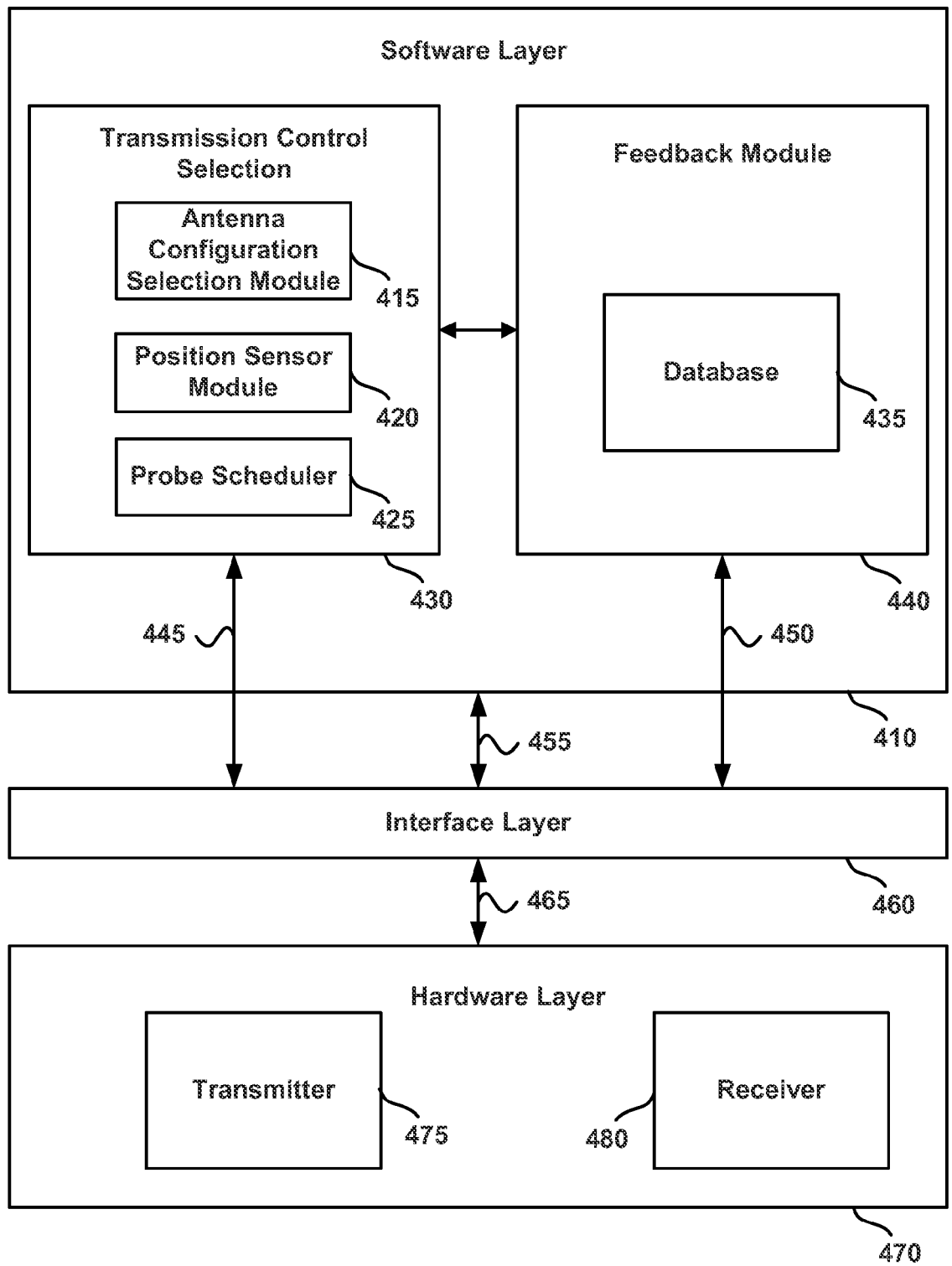
FIG. 4 is a block diagram of an exemplary software layer, interface layer and hardware layer of the wireless device of FIG. 3.

FIG. 4 illustrates a block diagram of an exemplary software layer 410, interface layer 460, and hardware layer 470 of the wireless device of FIG. 3. The software layer 410 and the interface layer 460 include instructions executed by processor 310. Hardware layer 470 includes hardware elements of the device 100 described with respect to FIG. 3, such as the processor 310, antenna element selector 345, signal converter 350, and antenna apparatus 355. Although described as software and hardware elements, aspects of the device 300 may be implemented with any combination of software, hardware, and firmware elements.

Software layer 410 of FIG. 4 includes a transmission control selection module 430 and a feedback module 440. The transmission control selection module 430 of FIG. 4 includes an antenna configuration selection module 415, position sensor module 420, and probe scheduler 425. The feedback module 440 is communicatively coupled to database 435, which may be integrated in the feedback module 440. The hardware layer 470 of FIG. 4 includes a transmitter 460 and a receiver 465.

The transmission control selection 430 is communicatively linked to feedback module 440. Transmission control selection 430 communicates with the interface layer 460 via link 445. The feedback module communicates with the interface layer 460 via link 450. The interface layer 460 receives packets via link 455 from software layer 410 and sends the packets to the transmitter 475 in the hardware layer 470. The interface layer 460 also receives packets from receiver 465 in the hardware layer 470 and sends the packets to the software layer 410 via link 445.

The transmission control selection 430 includes software elements configured to select and communicate through the interface layer 460 the current antenna configuration and the current physical data rate based on the feedback module 440, probe scheduler 425, or position sensor module 420. The probe scheduler 425 includes software elements configured to determine for the transmission control selection 430 an unused antenna configuration and an unused physical data rate based on predetermined criteria.

One example of the predetermined criteria is determining an unused antenna configuration after the interface layer 460 indicates as received five consecutive packets. The feedback module 440 includes software elements configured to update link quality metrics for each antenna configuration and each physical data rate based on feedback from the interface layer 460. The feedback module 440 is configured to maintain the link quality metrics in the database 435. The position sensor module 420 includes software elements that receive and process signals from accelerometer 315 and tilt sensor 320 (FIG. 3). The processing may include determining whether to initiate selection of a new antenna configuration based on the signals received by position sensor module 420. The operation of the software layer 410, the interface layer 460, and the hardware layer 470 are described below with respect to FIG. 6 and FIG. 7.

An advantage of the device 300 is that transmission control selection 430 may select, for example, an antenna configuration for the antenna apparatus 355 that minimizes interference for communicating over the wireless link to the remote receiving node 130 based on feedback (i.e., direct or indirect) from the receiving node. The interface layer 460 indicates whether the remote receiving node received transmitted packets on a particular antenna configuration and physical data rate. Further, transmission selection control 410 may select another antenna configuration for communicating over the wireless link to the remote receiving node 130 based on the feedback, thereby changing the radiation pattern of the antenna apparatus 355 to minimize interference in the wireless link.

The transmission control selection 430 may select the appropriate antenna configuration corresponding to a maximum gain for a wireless links between the device 300 and a remote receiving node 130. Alternatively, transmission control selection 430 may select the antenna configuration corresponding to less than maximal gain, but corresponding to reduced interference for the particular position of the device. A further advantage is that transmission control selection 430 may select the physical data rate that provides the maximum effective user data rate at the remote receiving node 130.

FIG. 5 illustrates an exemplary table 500 of transmission control data as may be utilized by the wireless device of FIG. 3. The table 500 of transmission control data may be contained in database 435 and accessed by execution of the various software elements of feedback module 440. Table 500 includes columns of device position, antenna configuration, attempted transmissions, successful transmissions, success ratio and RSSI.

The rows of the table 500 correspond to the multiple antenna configurations of the antenna apparatus 355. For example, a table of transmission control data for the antenna apparatus 355 having four selectable antenna elements {A, B, C, D}, would have fifteen possible antenna configurations comprising the set {A|B|C|D|AB|AC|AD|BC|BD|CD|ABC|ABD|ACD|BCD|ABCD}, and up to 15 rows of table entries.

The table 500 may be kept in the database 435 of FIG. 4 for each of the remote receiving nodes 120-140. Each of the remote receiving nodes 120-140 may require different antenna configurations and/or physical data rates for optimal performance of each of the wireless links between the device and remote receiving nodes 120-140, therefore multiple table 500s may be kept. For example, if five remote receiving nodes were associated with the device 100, the processor 320 would maintain a separate table 500 for each of the five remote receiving nodes. For ease of discussion, only a single table 500 will be discussed.

The table 500 identifies, for each of several positions for each antenna configuration, a number of attempted transmissions and a number of successful transmissions. Feedback module 440 updates the number of attempted transmissions for the current antenna configuration after interface layer 460 indicates a packet has transmitted to a remote receiving node. The feedback module 440 updates the number of successful transmissions after the interface layer 460 indicates the packet is received by the remote receiving node. In some embodiments, rather than updating the number of attempted transmissions when the device driver transmits the packet, the feedback module 440 may update the number of attempted transmissions after the interface layer 460 indicates whether the remote receiving node received the packet.

The number of device positions for which transmission control data can be collected can vary based on device resources, designer preference, and other factors. For example, device positions can be associated with pre-arranged ninety degree intervals, such as flat up, vertical facing up, flat facing down, vertical facing down. Further, the positions can be created as the device is placed in the position. In this case, the tilt sensor 320 can provide position information to position sensor module 420, which can in turn provide the position information to feedback module 440 to be stored in table 500. When position information is stored in the "device position" column, transmission control data can be configured for different antenna configurations at the particular position.

Table 500 also stores a success ratio and a RSSI. Although the success ratio and the RSSI are illustrated in the table, other link quality metrics may be stored in the table 500, such as voltage standing wave ratio (VSWR), signal quality, bit error rate, and error vector magnitude (EVM). The success ratio includes a computation of the number of successful transmissions divided by the number of attempted transmissions.

The RSSI includes an indication of the strength of the incoming (received) signal in the receiver 480 (e.g., as measured on an 802.11 ACK packet received from the remote receiving node 120 in response to a packet transmitted to the remote receiving node 120). The RSSI may provide a better measurement than the success ratio for differentiating between antenna configurations. The RSSI may provide a better link quality metric for determining the current antenna configuration when each antenna configuration has small values for the number of attempted transmissions and the number of successful transmissions.

In one example, if two packets are sent to the remote receiving node 120 using two separate antenna configurations and are received, there may not be enough information based alone on the respective success ratios to indicate whether one antenna configuration is more reliable. Each of the two separate antenna configurations has a success ratio of 100% (e.g., 2 attempted transmissions over 2 successful transmissions). The RSSI may provide a more precise link quality metric. If one antenna configuration has the RSSI value of 110 and the other antenna configuration has the RSSI value of 115, for example, then the antenna configuration with the stronger RSSI would potentially provide a more stable wireless link.

Figure 6:
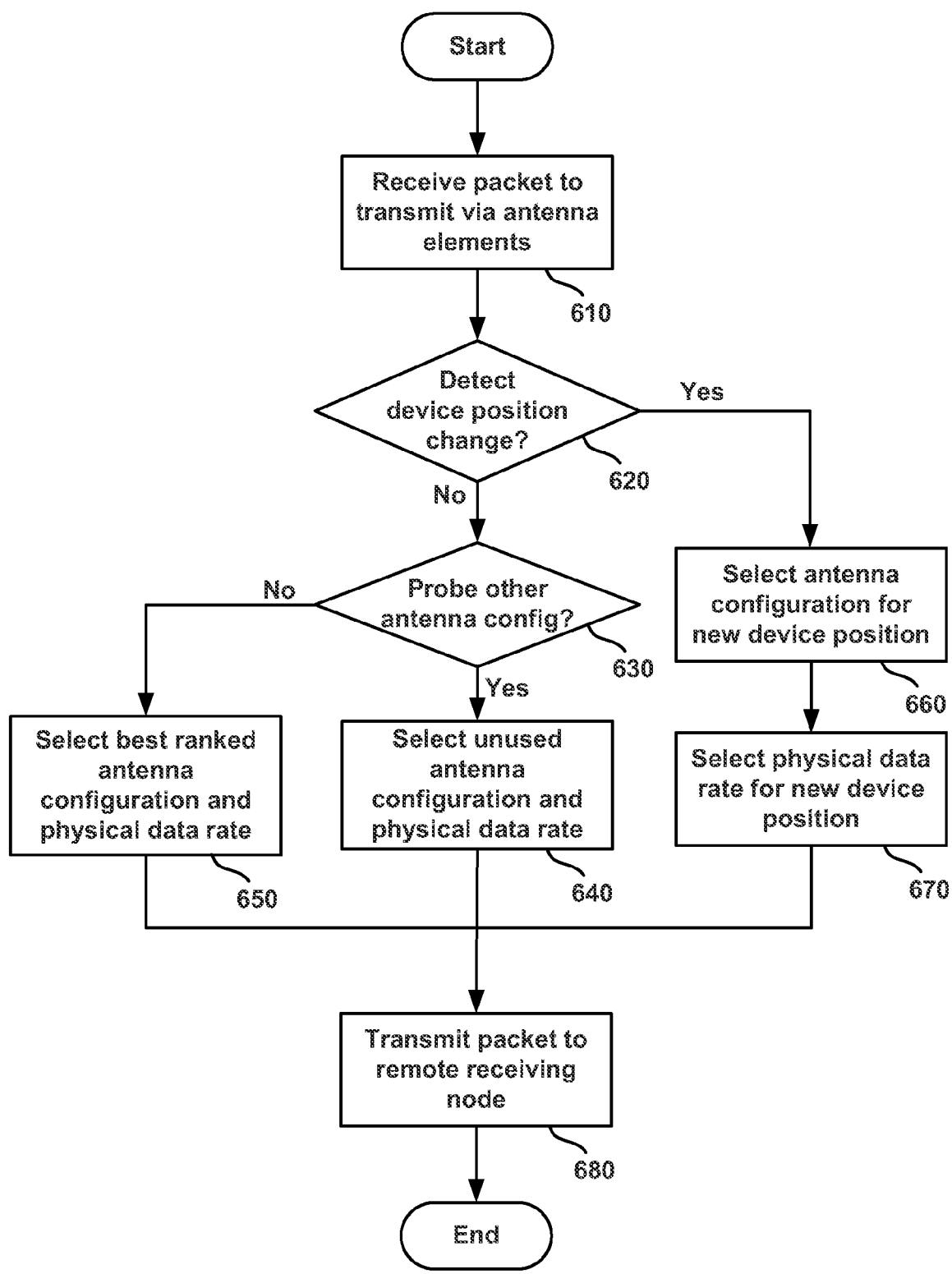
FIG. 6 is an exemplary method for transmitting data based on the physical position of a wireless device.

FIG. 6 is an exemplary method for transmitting data based on the physical position of a wireless device. Feedback module 440 may initialize the number of attempted transmissions and successful transmissions in table 500 to be zero. In some embodiments, the feedback module 440 may determine alternative initialization values for the table 500. For example, the feedback module 440 may determine initialization values for an antenna configuration that provides a substantially omnidirectional radiation pattern. The initialization values for the antenna configuration may be a high value for the success ratio or the RSSI to force transmission control selection 430 to select the antenna configuration for the interface layer 460.

In step 610, packets are received for transmission using antenna elements of antenna apparatus 355. The packets can be received from over network 360 from another wireless device or a wired network, through input 330, or with respect to data in memory 340 (FIG. 3). The packets may be encoded and converted to RF format by signal converter 350. The converted packets can be provided to interface layer 460.

A decision is made as to whether a change in device position is detected at step 620. The position change may be detected by tilt sensor 320, accelerometer 315, or a GPS device. Tilt sensor 320 in a wireless router device 300 may detect that the device has been moved from a vertical position mounted to a wall to a horizontal position on a table. A tilt sensor within a cellular phone device 300 may detect that the phone is moved from a horizontal position on a desk to a vertical position such as when a user picks up the phone to view a phone display. An accelerometer may detect that a gaming platform device 300 is being moved around and is undergoing dynamic acceleration forces. Either an accelerometer or a tilt sensor may detect that a laptop device 300 is moved as a user moves the device to another room. If any of tilt sensor 320, accelerometer 315, or GPS device detects a change, the detecting element will send a signal with position information to position sensor module 420.

In addition to detecting a change in position, tilt sensor 320 (or another position sensor) may detect the current position of wireless device 300 without detecting a device position change at step 620. The position of wireless device 300 may be detected while wireless device 300 is stationary. For example, tilt sensor 320 can detect the wireless device position after the wireless device 300 has been stationary for a period of time or after detecting that movement of the wireless device 300 has stopped. Tilt sensor 320 may send position information indicating the current position of the wireless device to position module 420.

The position information may indicate a level of tilt, a measure of acceleration, data regarding a current position of the device, data regarding a delta in the position of the device, GPS location data, or some other information representing motion or a position of the device 300. Position sensor module 420 receives the position information and sends a signal to antenna configuration selection module 415 indicating the current device position or a device position change occurred.

An antenna configuration for the new device position is selected at step 660. The antenna configuration can be selected based on the current device position or a change in detected device position. The antenna configuration is selected from the multiple antenna configurations in the table 500. For example, the transmission control selection 430 selects the best ranked antenna configuration for the current position having the highest success ratio. The transmission control selection 430 may alternatively select the antenna configuration having the highest RSSI for the current position.

In step 670, transmission control selection 430 selects the current physical data rate from the multiple physical data rates provided by signal converter 120. The multiple physical data rates may be defined as in the IEEE 802.11 specification for wireless networks, including the physical data rates such as 1 Mbps, 2 Mbps, 5.5 Mbps, and 11 Mbps for IEEE 802.11b. In step 680, the interface layer 460 sends the packet to the transmitter 460 of the hardware layer 470. The transmitter 460 transmits the packet on the current antenna configuration at the current physical data rate over the wireless link to a particular remote receiving node.

Returning to step 620, if transmission control selection 430 determines that the position information does not indicate a new current position or there is no change in the device position, then probe scheduler 425 of transmission control selection 430 determines whether to probe another antenna configuration at step 630. Another antenna configuration can be probed if the number of packets transmitted using the current antenna configuration satisfies a threshold number of packets, for example five packets.

If the probe scheduler 425 determines not to perform a probe at step 630, transmission control selection 430 selects the current antenna configuration for antenna apparatus 355 from the multiple antenna configurations in the table 500 in step 650. For example, transmission control selection 430 may select the listed antenna configuration having the highest success ratio. In an alternative embodiment, transmission control selection 430 may select the antenna configuration having the highest RSSI.

Transmission control selection 430 can also select the current physical data rate from the multiple physical data rates provided by the signal converter 120. The multiple physical data rates may be defined as in the IEEE 802.11 specification. The interface layer 460 sends the packet to the transmitter 460 of the hardware layer 470. The transmitter 460 transmits the packet on the current antenna configuration at the current physical data rate over a wireless link to a particular remote receiving node (e.g., the remote receiving node 120).

Returning to step 630, retransmission of the packet may be a priority if the transmitted packet is not confirmed as received by the remote receiving node 120. The need for retransmission may indicate problems in the wireless link between the transmitting device and the remote receiving node. When retransmitting the packet, transmission control selection 430 attempts to determine the antenna configuration for retransmission and the physical data rate for retransmission that is most likely to be successful. In step 640, the transmission control selection 430 selects an antenna configuration for retransmission. In some embodiments, the transmission control selection 430 selects the next lower ranked antenna configuration in the table 500. Transmission control selection 430 may also select a physical data rate for retransmission. The transmitter 460 then transmits the packet in step 680.

In some embodiments, transmission control selection 430 selects the same current antenna configuration, but incrementally lowers the physical data rate at which the packet is retransmitted to the remote receiving node 120. The lower physical data rate provides the remote receiving node 120 more time to obtain a successful reception of the packet. In other embodiments, for each retransmission, transmission control selection 430 alternates between selecting the next antenna configuration based on the success ratio and the RSSI.

For example, on the first retransmission, transmission control selection 430 selects the next lower ranked antenna configuration based on the success ratio. If the interface layer 460 determines that the remote receiving node 120 did not indicate reception of the packet, interface layer 460 will retransmit the packet, and transmission control selection 430 will select the next lower ranked antenna configuration based on the RSSI. For each subsequent retransmission to the remote receiving node 120, transmission control selection 430 alternates between selecting antenna configurations based on the success ratio and the RSSI.

Referring back to step 630, when a number of consecutive packets are successfully transmitted to and indicated as received by remote receiving node 120, indicating stability in the wireless link, transmission control selection 430 may determine to perform a probe of unused antenna configurations. Probing is the temporary changing of the current antenna configuration to one of the unused antenna configurations for transmission of a packet. The unused antenna configuration is any antenna configuration that is not the current antenna configuration. Probing allows the feedback module 440 to update the values of the table 500 for the unused antenna configurations. Probing consciously and temporarily changes the current antenna configuration to ensure that the database 435 is not stale. Additionally, probing allows the device 100 to anticipate changes in the wireless link.

Based on a positive determination to perform a probe by referencing the probe scheduler 425, transmission control selection 430 in step 640 selects an unused antenna configuration. Transmitting on the unused antenna configuration may result in a higher ranked success ratio than the current antenna configuration. Further, transmission control selection 430 may probe an unused physical data rate. In step 680, the transmitter 460 transmits the probe packet to the remote receiving node 120.

Figure 7:
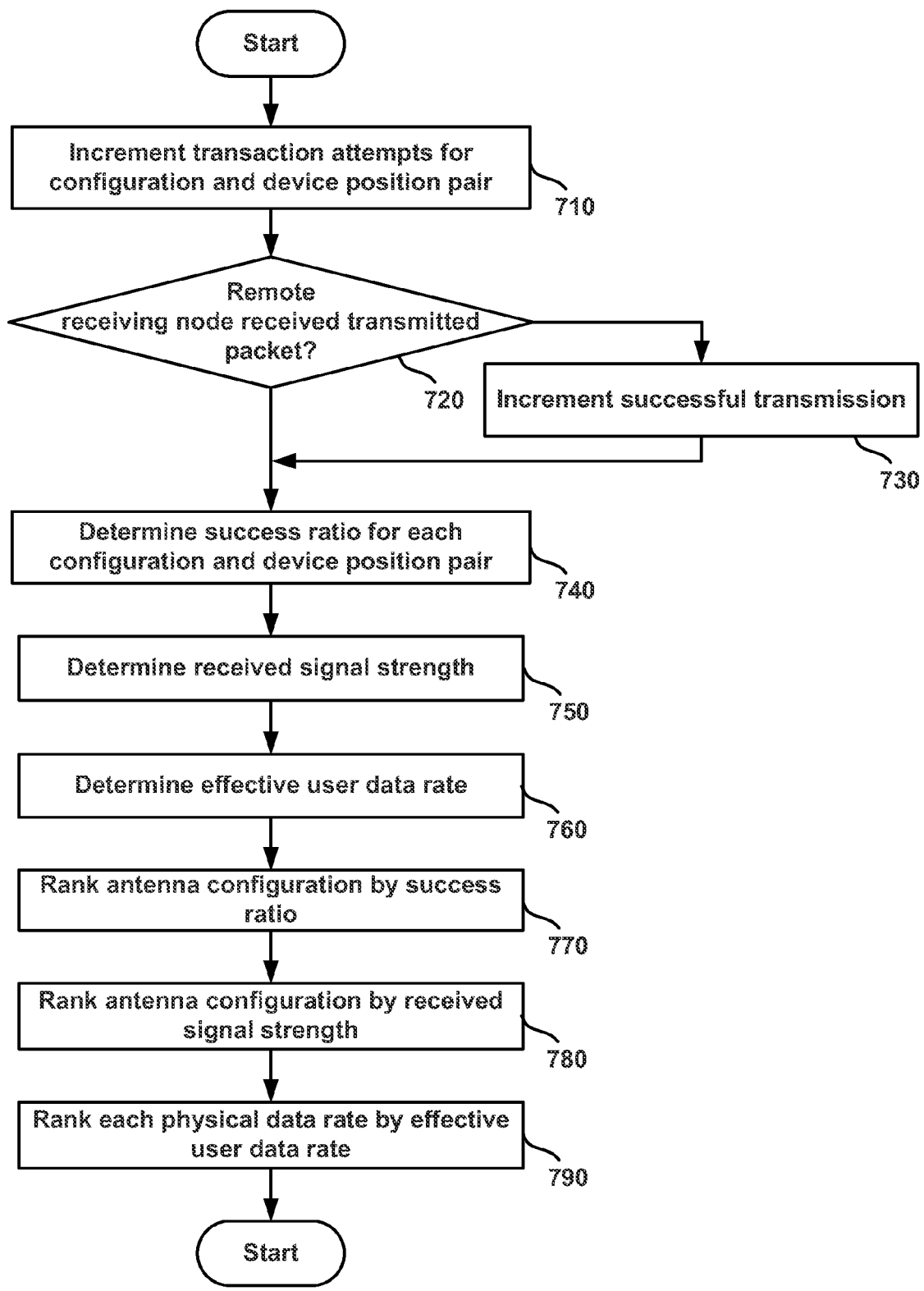
FIG. 7 illustrates an exemplary method for processing feedback at a wireless device.

FIG. 7 illustrates an exemplary method for processing feedback at a wireless device. The method begins in step 705 after transmission of the packet, as described with respect to FIG. 6. In step 710, the feedback module 440 increments the number of attempted transmissions 520 for the current antenna configuration. FIG. 7 illustrates an exemplary method for processing feedback at a wireless device.

In step 720, the interface layer 460 determines whether the remote receiving node 120 indicated reception of the transmitted packet. If the remote receiving node 120 indicated reception of the packet, the feedback module 440 increments the number of successful transmissions 530 for the current antenna configuration. In some embodiments, whether the remote receiving node 120 indicated reception of the packet or not, the feedback module 440 computes the success ratio for each antenna configuration.

As previously discussed with respect to FIG. 5, feedback module 440 determines a variety of link quality metrics which allow the transmission control selection 430 to select an antenna configuration. In step 730, the feedback module 440 may determine the RSSI for each antenna configuration 510 for the remote receiving node 120. In step 735, the feedback module 440 may determine the effective user data rate for each physical data rate of each antenna configuration.

In step 740, the feedback module 440 ranks each of the antenna configurations by the success ratio for each configuration and device position pair. In step 745, the feedback module 440 may also rank the antenna configurations by the RSSI. In step 750, feedback module 440 may rank each physical data rate of each antenna configuration for the remote receiving node 120 by the effective user data rate. This enables the transmission control selection 430 to select a physical data rate that may have a higher effective user data rate than the current physical data rate.

The embodiments disclosed herein are illustrative. Various modifications or adaptations of the structures and methods described herein may become apparent to those skilled in the art. Such modifications, adaptations, and/or variations that rely upon the teachings of the present disclosure and through which these teachings have advanced the art are considered to be within the spirit and scope of the present invention. Hence, the descriptions and drawings herein should be limited by reference to the specific limitations set forth in the claims appended hereto.

What is claimed is:

1. A wireless device for wirelessly exchanging data in a wireless local area network, the wireless device comprising:
    an antenna apparatus associated with a plurality of antenna configurations, each antenna configuration associated with a different radiation pattern;
    a position sensor that detects a change in position of the wireless device;
    a memory storing link quality metrics for each of the plurality of antenna configurations; and a processor executes an antenna configuration selection module stored in the memory, the antenna configuration selection module selecting a particular antenna configuration for the antenna apparatus from a set of two or more antenna configurations associated with the position change of the wireless device detected by the position sensor, wherein the particular antenna configuration is selected based on link quality metrics stored in the memory for each antenna configuration in the set of antenna configurations.

2. The wireless device of claim 1, further comprising an antenna element selector that selects a group of one or more antenna elements in the antenna apparatus to provide the radiation pattern associated with the particular antenna configuration from the plurality of antenna configurations in response to a control signal generated in response to the execution of the antenna configuration selection module.

3. The wireless device of claim 1, wherein the position sensor is a tilt sensor.

4. The wireless device of claim 1, wherein the position sensor is an accelerometer.

5. The wireless device of claim 1, wherein the position sensor is a global positioning system device.

6. The wireless device of claim 1, wherein the change in position is associated with ninety degree orientation change of the wireless device.

7. The wireless device of claim 1, wherein selecting the particular antenna configuration comprises changing from an initial antenna configuration having a first radiation pattern to the particular antenna configuration having a second radiation pattern different from the first radiation pattern.

8. The wireless device of claim 1, wherein link quality metrics for the particular antenna configuration include stored transmission data indicating successful transmissions for the particular antenna configuration at the changed position.

9. The wireless device of claim 1, further comprising a signal converter that converts an encoded signal to a radio frequency signal.

10. The wireless device of claim 1, further comprising a display device that provides information to a user of the wireless device.

11. A wireless device for wirelessly exchanging data in a wireless local area network, comprising:
an antenna apparatus having a plurality of antenna configurations, each antenna configuration corresponding to a different radiation pattern;
a memory storing link quality metrics for each of the plurality of antenna configurations;
an antenna configuration selection module stored in the memory and executable by a processor to select a first antenna configuration for the antenna apparatus at a first device position; and
a tilt sensor configured to detect a position change of the wireless device, wherein the antenna configuration selection module selects a second antenna configuration for the antenna apparatus from a set of two or more antenna configurations associated with a detected second device position, wherein the second device position is selected based on link quality metrics stored in the memory for each antenna configuration in the set of antenna configurations.

12. The wireless device of claim 11, further including a position sensor module stored in the memory and executable by the processor to receive and process a signal from the tilt sensor indicating the position of the device.

13. The wireless device of claim 11, wherein the tilt sensor is configured to detect a position change from the first device position to the second device position.

14. The device of claim 11, further including an input device for receiving input from a user.

15. The wireless device of claim 11, wherein the wireless device is a cellular telephone.

16. The wireless device of claim 11, wherein the wireless device is a laptop computer.

17. A wireless device for wirelessly exchanging data in a wireless local area network, the wireless device comprising:
an antenna apparatus having a plurality of antenna configurations, each antenna configuration associated with a different radiation pattern
a memory storing link quality metrics for each of the plurality of antenna configurations;
a position sensor configured to detect a position of the wireless device; and
an antenna configuration selection module stored in the memory and executable by a processor to select a particular antenna configuration for the antenna apparatus from a set of two or more antenna configurations associated with the detected position of the wireless device, wherein the particular antenna configuration is selected based on link quality metrics stored in the antenna memory for each antenna configuration in the set of antenna configurations.

18. The wireless device of claim 17, the position sensor configured to detect the position of the wireless device while the wireless device is stationary.

19. The wireless device of claim 17, the position sensor configured to detect the position of the wireless device after the wireless device position has changed.

20. The wireless device of claim 17, the antenna configuration selection module selecting a first antenna configuration based on a first detected position and selecting a second antenna configuration based on a second detected position, the plurality of antenna configurations including the first antenna configuration and second antenna configuration.

21. A method for adjusting a radiation pattern of a device, comprising:
selecting a first antenna configuration associated with a first radiation pattern while the device is at a first position;
transmitting an RF signal utilizing the first antenna configuration;
detecting by a sensor that the device position has changed from the first position to a second position;
selecting a second antenna configuration associated with a second radiation pattern different from the first radiation pattern based on the change in device position, wherein the second antenna configuration is selected from a set of two or more antenna configurations associated with the second position based on link quality metrics for each antenna configuration in the set of antenna configurations; and
transmitting an RF signal utilizing the second antenna configuration.

22. The method of claim 21, further including receiving a signal from a tilt sensor, the received signal associated with a change in the position of the device.

23. The method of claim 21, further including accessing a table of antenna configuration data associated with device position information.

24. The method of claim 21, further including selecting the antenna configuration based on antenna configuration performance data for the second position of the device.

25. A method for adjusting a radiation pattern of a device, comprising:
- selecting a first antenna configuration associated with a first radiation pattern while the device is at a first position; receiving an RF signal utilizing the first antenna configuration;
- detecting by a sensor that the device position has changed from the first position to a second position;
- selecting a second antenna configuration associated with a second radiation pattern different from the first radiation pattern based on the change in device position, wherein the second antenna configuration is selected from a set of two or more antenna configurations associated with the second position based on link quality metrics for each antenna configuration in the set of antenna configurations; and
- receiving an RF signal utilizing the second antenna configuration.

26. The method of claim 25, further including receiving a signal from a tilt sensor, the received signal associated with a change in the position of the device.

27. The method of claim 25, further including accessing a table of antenna configuration data associated with device position information.

28. The method of claim 25, further including selecting the antenna configuration based on antenna configuration performance data for the current position of the device.

* * * * *